United States Patent
Fuji et al.

(10) Patent No.: US 7,785,662 B2
(45) Date of Patent: Aug. 31, 2010

(54) METHOD FOR MANUFACTURING MAGNETORESISTIVE ELEMENT

(75) Inventors: Yoshihiko Fuji, Kawasaki (JP); Hideaki Fukuzawa, Kawasaki (JP); Hiromi Yuasa, Kawasaki (JP); Hitoshi Iwasaki, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 609 days.

(21) Appl. No.: 11/583,968

(22) Filed: Oct. 20, 2006

(65) Prior Publication Data

US 2007/0092639 A1 Apr. 26, 2007

(30) Foreign Application Priority Data

Oct. 21, 2005 (JP) ............................. 2005-306975

(51) Int. Cl.
*H05H 1/00* (2006.01)
*H01F 41/00* (2006.01)
*H01F 41/22* (2006.01)

(52) U.S. Cl. .................... 427/248.1; 427/533; 427/535; 427/539; 427/127; 427/128; 427/130; 427/131; 427/132

(58) Field of Classification Search ................. 427/533, 427/535, 539, 127, 128, 130, 131, 132
See application file for complete search history.

(56) References Cited

U.S. PATENT DOCUMENTS

| | | | |
|---|---|---|---|
| 6,096,434 A * | 8/2000 | Yano et al. ................... 428/446 |
| 7,218,484 B2 | 5/2007 | Hashimoto et al. |
| 7,514,117 B2 * | 4/2009 | Fukuzawa et al. ............ 427/127 |
| 2002/0191355 A1 * | 12/2002 | Hiramoto et al. .......... 360/324.2 |
| 2004/0201929 A1 * | 10/2004 | Hashimoto et al. ....... 360/324.1 |
| 2005/0094317 A1 | 5/2005 | Funayama |
| 2007/0259213 A1 | 11/2007 | Hashimoto et al. |

FOREIGN PATENT DOCUMENTS

| | | |
|---|---|---|
| JP | 2002-208744 | 7/2002 |
| JP | 2004-153248 | 5/2004 |
| JP | 2005-136309 | 5/2005 |
| JP | 2006-54257 | 2/2006 |

OTHER PUBLICATIONS

U.S. Appl. No. 11/199,448, filed Aug. 2005, Fukuzawa et al.
Office Action dated Mar. 2, 2010 in Japanese Patent Application No. 2005-306975, and English-language translation thereof.

* cited by examiner

*Primary Examiner*—Timothy H Meeks
*Assistant Examiner*—Mandy C Louie
(74) *Attorney, Agent, or Firm*—Nixon & Vanderhye, PC

(57) ABSTRACT

There is provided a method for manufacturing a magnetoresistive element having a magnetization pinned layer, a magnetization free layer, and a spacer layer including an insulating layer arranged between the magnetization pinned layer and the magnetization free layer and current paths passing through the insulating layer. The method includes, in producing the spacer layer, depositing a first non-magnetic metal layer forming the current paths, depositing a second metal layer to be converted into the insulating layer on the first non-magnetic metal layer, and performing two stages of oxidation treatments in which a partial pressure of an oxidizing gas in a first oxidation treatment is set to 1/10 or less of a partial pressure of an oxidizing gas in a second oxidation treatment, and the second metal layer being irradiated with an ion beam or a RF plasma of a rare gas in the first oxidation treatment.

9 Claims, 5 Drawing Sheets

First oxidation

Second oxidation

METHOD FOR MANUFACTURING MAGNETORESISTIVE ELEMENT

CROSS-REFERENCE TO RELATED APPLICATIONS

This application is based upon and claims the benefit of priority from prior Japanese Patent Application No. 2005-306975, filed Oct. 21, 2005, the entire contents of which are incorporated herein by reference.

BACKGROUND OF THE INVENTION

1. Field of the Invention

The present invention relates to a method for manufacturing a magnetoresistive element having a structure in which a sense current is supplied perpendicularly to the plane of the magnetoresistive film.

2. Description of the Related Art

In recent years, reduction in size and increase in density of hard disk drive (HDD) are rapidly improved, and this trend will be accelerated in the near future. In order to improve the density of HDD, it is necessary to reduce the width of the recording track to increase the track density. However, the decrease in track width leads to reduction in size of the recorded magnetization, i.e., in magnitude of recording signals. For this reason, it is essential to improve readout sensitivity of the magnetic head reading medium signals.

Recently, GMR heads utilizing a giant magnetoresistance effect (GMR) including a high-sensitivity spin valve film are used. The "spin-valve film" is a multi-layered film having a structure in which a nonmagnetic metal spacer layer is sandwiched between two ferromagnetic layers. In the spin-valve film, the magnetization of one ferromagnetic layer (referred to as a "pinned layer" or "magnetization pinned layer") is pinned by an antiferromagnetic layer or the like, whereas the magnetization of the other ferromagnetic layer (referred to as a "free layer" or "magnetization free layer") is made rotatable in accordance with an external field. In the spin-valve film, a giant magnetoresistace effect can be produced by change of the relative angle between the magnetization directions of the two ferromagnetic layers.

Conventional GMR heads including the spin-valve film have a current-in-plane (CIP) structure in which a sense current is supplied parallel to the plane of the element (referred to as a CIP-GMR element). On the other hand, much attention has been paid to a current-perpendicular-to-plane (CPP)-GMR element in which a sense current is supplied substantially perpendicular to the plane of the element because the CPP-GMR element exhibits a greater GMR effect than the CIP-GMR element. However, a metal CPP element in which the pinned layer, the spacer layer and the free layer are made of metal exhibits only a low resistance change $\Delta RA$ when a current supplied perpendicularly to the film plane, even though a giant magnetoresistance effect is obtained, because the element has a low element resistance. In order to attain increase in magnetoresistive ratio of the CPP-GMR element, there is proposed a CPP-GMR element using a nano-oxide layer (NOL) containing current paths (current confined paths: CCPs) in the direction perpendicular to the film plane as the nonmagnetic spacer layer. See, for example, JP-A 2002-208744 (KOKAI). Hereinafter, such an element will be referred to as a CCP-CPP element. The CCP-CPP element can increase both the element resistance and the magnetoresistive ratio awing to the current confinement effect.

For forming a spacer layer of the CCP-CPP element, known is a method of oxidizing an alloy layer consisting of two or more metal elements different in energy of oxidation, thereby forming current paths with a less oxidizable metal element and converting a more oxidizable metal element into an insulating layer.

According to studies by the present inventors, when a CCP-GMR element is fabricated by the above method, the resulting element has the following advantages, compared to the metal CPP element. Here, a metal CPP element having a structure of lower electrode/Ta [5 nm]/Ru [2 nm]/$Pt_{50}Mn_{50}$ [15 nm]/$Co_{90}Fe_{10}$ [4 nm]/Ru [0.9 nm]/$Co_{90}Fe_{10}$ [4 nm]/Cu [5 nm]/$Co_{90}Fe_{10}$ [1 nm]/$Ni_{83}Fe_{17}$ [3.5 nm]/Cu [1 nm]/Ta [5 nm]/upper electrode is fabricated. The element is heat-treated in a magnetic field at 270° C. for 10 hours as ordering heat treatment for PtMn to pin the pinned layer. On the other hand, a CCP-CPP element having a spacer layer of a NOL formed by natural oxidation of $Al_{90}Cu_{10}$ [0.7 nm], instead of the Cu spacer layer in the above CPP element, is fabricated. Evaluation of characteristics of the metal CPP element showed an areal resistance RA of 100 $m\Omega\mu m^2$, an areal resistance change $\Delta RA$ of 0.50 $m\Omega\mu m^2$, and a MR ratio of 0.5%. As described above, the metal CPP element exhibits a low MR ratio because of the low element resistance even though it has a high magnetoresistive effect. On the other hand, evaluation of characteristics of the CCP-CPP element showed an areal resistance RA of 350 $m\Omega\mu m^2$, an areal resistance change $\Delta RA$ of 5.6 $m\Omega\mu m^2$, and a MR ratio of 1.5%. This indicates that the areal resistance RA is favorable and the areal resistance change $\Delta RA$ is more improved than that of the metal CPP element.

However, for detection of weak signals from a medium with a high recording density of 200 to 500 Gbpsi, the CCP-CPP element fabricated by using the above method has difficulty in satisfying both the areal resistance RA and the MR ratio. Studies by the present inventors suggested that insufficient element characteristics are caused by low purity of the current paths in the insulating layer.

BRIEF SUMMARY OF THE INVENTION

According to an aspect of the present invention, there is provided a method for manufacturing a magnetoresistive element having a magnetization pinned layer, a magnetization free layer, and a spacer layer including an insulating layer and current paths passing through the insulating layer, provided between the magnetization pinned layer and the magnetization free layer, the method comprising, in producing the space layer:

depositing a first non-magnetic metal layer forming the current paths;

depositing a second metal layer to be converted into the insulating layer on the first non-magnetic metal layer; and performing two stages of oxidation treatments in which a partial pressure of an oxidizing gas in a first oxidation treatment is set to 1/10 or less of a partial pressure of an oxidizing gas in a second oxidation treatment, two stages of nitriding treatments in which a partial pressure of a nitriding gas in a first nitriding treatment is set to 1/10 or less of a partial pressure of a nitriding gas in a second nitriding treatment or two stages of oxynitriding treatments in which a partial pressure of an oxynitriding gas in a first oxynitriding treatment is set to 1/10 or less of a partial pressure of an oxynitriding gas in a second oxynitriding treatment, and the second metal layer being irradiated with an ion beam or RF plasma of a rare gas in the first oxidation treatment, the first nitriding treatment or the first oxynitriding treatment.

DETAILED DESCRIPTION OF THE INVENTION

Figure 1:
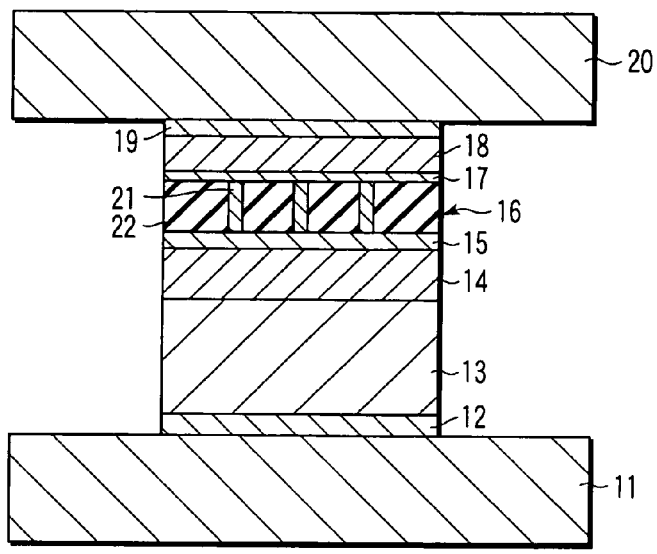
FIG. 1 is a cross-sectional view showing a CCP-CPP element according to an embodiment.

FIG. 1 is a cross-sectional view showing a magnetoresistive element (CCP-CPP element) according to an embodiment. The magnetoresistive element shown in FIG. 1 has a substrate, and a lower electrode 11, an underlayer 12, a pinning layer 13, a pinned layer 14, a metal layer 15, a spacer layer 16, a metal layer 17, a free layer 18, a cap layer 19, and an upper electrode 20 formed thereon. The spacer layer 16 (CCP-NOL) includes an insulating layer 22 and current paths 21 passing through the insulating layer 22.

The method of manufacturing the magnetoresistive element (CCP-CPP element) in the present embodiment will be described with reference to FIGS. 2A, 2B, 2C, and 2D. Here, a method of forming a nonmagnetic spacer layer having Cu current paths in an $Al_2O_3$ insulating layer will be described below as an example.

Figure 2A:
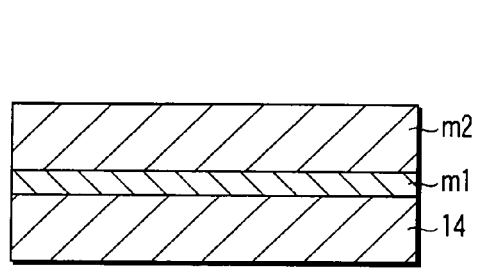
FIGS. 2A, 2B, 2C and 2D are cross-sectional views illustrating a method of manufacturing the CCP-CPP element in the embodiment.

As shown in FIG. 2A, after a lower electrode, an underlayer and a pinning layer are deposited on a substrate, and then, the pinned layer 14 is deposited thereon. A first non-magnetic metal layer m1 (e.g., Cu) forming current paths 21 is deposited on the pinned layer 14. A second metal layer m2 (e.g., AlCu or Al) to be converted into the insulating layer 22 is deposited on the first non-magnetic metal layer m1.

Figure 2B:
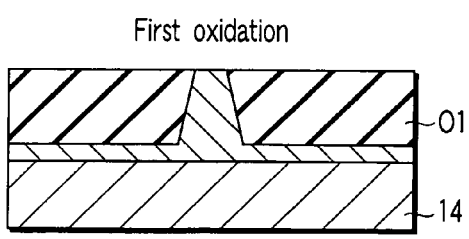
Figure 2C:
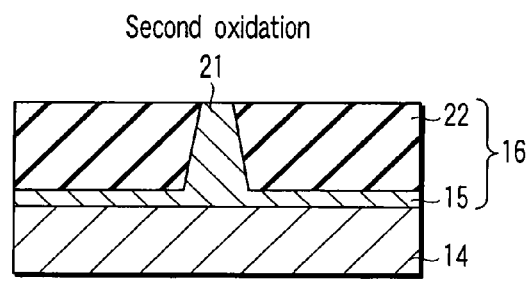

As shown in FIGS. 2B and 2C, two stages of oxidation treatments in which the partial pressure of the oxidizing gas in the first oxidation treatment is $1/10$ or less of the partial pressure of the oxidizing gas in the second oxidation treatment are performed. When a second metal layer of Al or AlCu is deposited and then an insulating layer of $Al_2O_3$ is formed in the two-stage oxidation treatments, the partial pressure of the oxidizing gas in the first oxidation treatment is preferably set to between $1 \times 10^{-8}$ and $1 \times 10^{-6}$ Torr, and the partial pressure of the oxidizing gas in the second oxidation treatment is preferably set to $1 \times 10^{-5}$ Torr or more, as will be described below.

In FIG. 2B, the first oxidation treatment is performed by supplying an oxidizing gas (e.g., $O_2$) to a chamber to set the partial pressure of the oxidizing gas to between $1 \times 10^{-8}$ and $1 \times 10^{-6}$ Torr and irradiating the second metal layer with an ion beam or RF plasma of a rare gas (e.g., Ar). With the first oxidation treatment, Al in the second metal layer m2 is converted into an incomplete oxide layer o1 represented by $AlO_x$ (where x ranges from 0.5 to 1.2), and Cu in the first non-magnetic metal layer m1 is sucked up in the incomplete oxide layer o1.

In FIG. 2C, the second oxidation treatment is performed by supplying an oxidizing gas to the chamber to set the partial pressure of the oxidizing gas to $1 \times 10^{-5}$ Torr or more. With the second oxidation treatment, the incomplete oxide layer o1 is converted into an insulating layer 22 of $Al_2O_3$ and current paths 21 passing through the insulating layer 22 are formed, whereby the spacer layer 16 is formed.

Figure 2D:
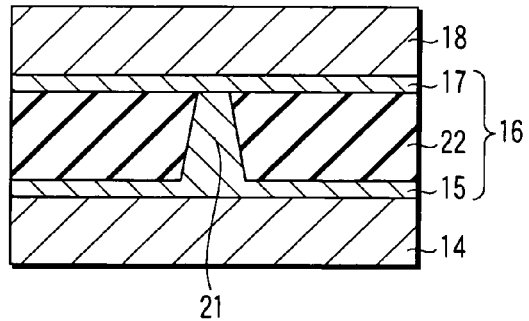

As shown in FIG. 2D, a metal layer 17 of, for example, Cu is deposited on the spacer layer 16 and the free layer 18 is deposited thereon. The metal layer 17 on the spacer layer 16, which serves to prevent the free layer formed thereon from being subjected to influence of oxidation, may not necessarily be formed.

By using the method of the present embodiment, it is possible to improve the purity of the current paths passing through the insulating layer of the spacer layer and to manufacture a magnetoresistive element having a favorable areal resistance RA and a high MR ratio.

In the embodiments of the present invention, in the process of producing the spacer layer containing the Cu current paths in the $Al_2O_3$ insulating layer, two-stage oxidation treatments in which the partial pressure of the oxidizing gas in the first oxidation treatment is set to $1/10$ or less of the partial pressure of the oxidizing gas in the second oxidation treatment are carried out as in FIGS. 2B and 2C. If a spacer layer containing Cu current paths in the $Al_2O_3$ insulating layer is to be formed, the partial pressure of the oxidizing gas in the first oxidation treatment is set to $1/10$ or less of the partial pressure of the oxidizing gas in the second oxidation treatment, and in particular, the partial pressure of the oxidizing gas in the first oxidation treatment is preferably set to between $1 \times 10^{-8}$ and $1 \times 10^{-6}$ Torr, and the partial pressure of the oxidizing gas in the second oxidation treatment is preferably set to $1 \times 10^{-5}$ Torr or more. The two-stage oxidation treatments are the most important processes in the method of the embodiments of the present invention in which the partial pressures of the oxidizing gas are altered for obtaining different effects. Hereinafter, the two-stage oxidation treatments will be described in detail.

The first oxidation treatment in FIG. 2B is a process of adjusting the partial pressure of the oxidizing gas in the chamber to between $1 \times 10^{-8}$ and $1 \times 10^{-6}$ Torr by supplying an oxidizing gas (e.g., $O_2$) and irradiating the second metal layer with an ion beam or RF plasma of a rare gas (e.g., Ar), by which Al in the second metal layer is converted into an incomplete oxide layer o1 represented by $AlO_x$ (where x ranges from 0.5 to 1.2) and the first non-magnetic metal layer m1 (Cu) is sucked up in the incomplete oxide layer o1.

The first oxidation is performed under the oxidizing gas partial pressure of between $1 \times 10^{-8}$ and $1 \times 10^{-6}$ Torr for the following two purposes. One purpose is to prevent mixing of the metal Cu which is sucked up and the metal Al by converting Al into $AlO_x$. Behaviors of interdiffusion are significantly different between when Cu is sucked up in the metal (Al) and when it is sucked up in the oxide ($AlO_x$). Cu easily forms an alloy when it is sucked up in a metal. Thus, the amount of the impurity Al in the Cu current paths sucked up in the $AlO_x$ layer is smaller than that in the Cu current paths sucked up in the Al layer.

The other purpose is to increase the efficiency of suck of Cu by irradiation with an ion beam or RF plasma. When the irradiation with the ion beam or RF plasma is performed under an oxidizing gas partial pressure of higher than $1\times10^{-6}$, irradiation of the ion beam to the $AlO_x$ layer is inhibited by the oxidizing gas to be insufficient, prohibiting energy assist sufficient to cause the suck of Cu. Accordingly, the partial pressure of the oxidizing gas in the first oxidation treatment is preferably $1\times10^{-6}$ Torr or less. For this reason, the partial pressure of the oxidizing gas in the first oxidation treatment is preferably set to between $1\times10^{-8}$ and $1\times10^{-6}$ Torr.

The partial pressure of the oxidizing gas in the first oxidation treatment can be calculated by determining the change in the degree of vacuum in the chamber when an oxidizing gas is supplied into the chamber at a particular flow rate without supplying Ar gas. For example, if the ultimate vacuum when no gas is supplied into the chamber is $1\times10^{-7}$ Torr and the degree of vacuum when an oxidizing gas is supplied at a certain flow rate is $5\times10^{-7}$ Torr, the increase in the degree of vacuum by supply of the oxidizing gas, $4\times10^{-7}$ Torr, is a design value for the partial pressure of the oxidizing gas at the flow rate of the oxidizing gas. Since there is an oxidizing gas present as residual gas in the chamber even when no oxidizing gas is supplied, the real value of the oxidizing gas partial pressure is higher than the designed value calculated by the above method by an amount equivalent to the partial pressure of the residual oxidizing gas. In order to eliminate deviation from the designed value and to control the oxidizing gas partial pressure accurately, the ultimate vacuum of the chamber is preferably $1\times10^{-7}$ or less. Although the degree of vacuum when only an oxidizing gas is supplied is different from that in the actual first oxidation treatment where Ar gas for an ion beam or Ar gas for an electron emitter is used, it is possible to calculate the oxidizing gas partial pressure when a particular oxidizing gas is supplied by the above calculation.

Alternatively, a mass spectrometric gas analyzer may be used for determining the oxidizing gas partial pressure in the first oxidation treatment. The mass spectrometric gas analyzer, also called residual gas analyzer or mass filter, determines the pressures of two or more gases, i.e., partial pressures, in the state where these gases are mixed. The mass spectrometric gas analyzer, which comprising an ion source, an analyzing unit and a detecting unit, determines the partial pressures by ionizing the molecules in the chamber at the ion sources, allowing only ions having particular mass-to-charge ratios to transmit under an electric or magnetic field in the analyzing unit, and collecting the ions in the detecting unit. Mass spectrometric gas analyzers are classified into magnetic field deflection type, omegatron type, quadrupole type and so forth, depending on the kind of the analyzing unit. Among them, the quadrupole mass spectrometric gas analyzers are widely used because of the advantages of demanding no magnetic field and thus being smaller in size. By using such a mass spectrometric gas analyzer, it is possible to separately monitor the partial pressure of the rare gas (e.g., Ar gas) and the partial pressure of the oxidizing gas simultaneously and, thus, to control the partial pressure of the oxidizing gas while monitoring the actual process.

The oxidizing gas for use in the first oxidation treatment includes, for example, $O_2$. Alternatively, a mixed gas of an oxidizing gas (e.g., $O_2$) and a rare gas (e.g., Ar) may be used, instead of $O_2$. The first oxidation treatment demands precise control of the partial pressure of oxidizing gas in the range of $1\times10^{-8}$ to $1\times10^{-6}$ Torr, but when a common mass-flow controller, which has too larger controllable gas flow rate, is used for supply of the oxidizing gas, it may result in difficulty in controlling the partial pressure of oxidizing gas, even if a flow rate at the lower limit in the controllable range is used. In such a case, it is possible to control the partial pressure of oxidizing gas more accurately by using a mixed gas as described above, even at the gas flow rate which the common mass-flow controller can control.

The period of the first oxidation treatment is preferably in a range of approximately 15 to 180 seconds, and more preferably 30 seconds or more, from the viewpoints of controllability and others. Excessively long first oxidation treatment is undesirable because it leads to decrease in throughput of CCP-CPP elements. The processing period is most preferably in a range of 30 to 180 seconds from these viewpoints.

In the first oxidation treatment, the second metal layer m2 to be converted into the insulating layer 22 of the spacer layer 16 is irradiated with an ion beam of a rare gas. Examples of the rare gases include Ar, Kr, He, and Xe. Use of Kr and Xe with a higher mass may lead to favorable results. Ar is most favorable in terms of production cost.

The conditions for irradiation of the ion-beam in the first oxidation treatment are preferably set to as follows: the accelerating voltage V+ is 30 to 130V, the beam current Ib is 20 to 200 mA, and the RF power for plasma excitation in the ion source to adjust the beam current to be constant is 10 to 300 W. These conditions are significantly weaker than those for ion-beam etching. This is because, if significant etching occurs in the first oxidation treatment, the second metal layer may be removed.

In the second oxidation treatment shown in FIG. 2C, the incomplete oxide $AlO_x$ is converted into the insulating layer 22 made of a complete oxide $Al_2O_3$ by setting the oxidizing gas partial pressure in the chamber to $1\times10^{-5}$ Torr or more with supply of an oxidizing gas (e.g., $O_2$). In order to cause to suck of Cu in the first oxidation treatment, the oxidizing gas partial pressure may not be set to higher than $1\times10^{-6}$ Torr, Al will not be converted into complete oxide $Al_2O_3$ in the first oxidation treatment. Because the incomplete oxide $AlO_x$ has an insufficient function as an insulating layer, current confinement effect in the Cu current paths with the CCP structure will be weakened. Thus, the second oxidation treatment aimed at forming the complete oxide $Al_2O_3$ is needed. In the second oxidation treatment, the $Al_2O_3$ insulating layer and the Cu current paths can be formed by using the properties that Al is susceptible to oxidation and Cu is resistant to oxidation.

The process of the second oxidation treatment may be, for example, natural oxidation or oxidation under an oxidizing gas while irradiating with an ion beam of a rare gas, but the latter process is more preferable. The latter process is called ion-beam assisted oxidation (IAO), in which oxidation and reduction proceed simultaneously by an energy-assisting effect of the ion beam. That is, less oxidizable Cu is reduced and more oxidizable Al is oxidized, and thus Cu current paths with higher purity can be formed. The increase in purity of the current paths improves the MR ratio of the CCP-CPP element.

The period of the second oxidation treatment is preferably in a range of approximately 15 to 180 seconds, and more preferably 20 seconds or more, from the viewpoint of controllability. Excessively long second oxidation treatment is undesirable because it leads to decrease in throughput of CCP-CPP elements. The processing period is most preferably in a range of 30 to 180 seconds from these viewpoints.

In performing IAO process in the second oxidation treatment, the conditions for the IAO process are preferably set to as follows: the accelerating voltage V+ for an ion beam or RF plasma of a rare gas is 40 to 200V, the beam current Ib is 30 to 200 mA, and the RF power for plasma excitation in the ion source to adjust the beam current to be constant is 20 to 400 W.

The favorable range of the exposure amount of an oxidizing gas (product of the partial pressure of the oxidizing gas and the processing period) in the second oxidation treatment is 1,000 to 5,000 L (1 L=1×10$^{-6}$ Torr×sec) for IAO, and 3,000 to 30,000 L for natural oxidation. The oxidizing gas partial pressure during IAO can be calculated similarly to the case in the first oxidation treatment, by determining the change in the degree of vacuum in the chamber when an oxidizing gas is supplied into the chamber at a particular flow rate without supplying Ar gas. For example, if the ultimate vacuum when no gas is supplied into the chamber is 1×10$^{-7}$ Torr and the degree of vacuum when an oxidizing gas is supplied at a certain flow rate is 5×10$^{-5}$ Torr, the increase in the degree of vacuum by supply of the oxidizing gas, 4.99×10$^{-5}$ Torr, is a design value for the partial pressure of the oxidizing gas at the flow rate of the oxidizing gas. The exposure amount of the oxidizing gas is adjusted properly depending on the partial pressure of the oxidizing gas and the processing period. The favorable partial pressure of the oxidizing gas in the case where the processing period is set to 100 sec is 1×10$^{-5}$ to 5×10$^{-5}$ Torr for IAO, and 3×10$^{-5}$ to 3×10$^{-4}$ Torr for natural oxidation. However, since the partial pressure of the oxidizing gas should be set to 1×10$^{-5}$ Torr or more for forming a complete oxide $Al_2O_3$, excessively long treatment cannot attain a suitable exposure amount of oxidizing gas. The processing period is most preferably set to in a range of approximately 30 to 180 seconds from the viewpoints of the controllability and throughput described above.

It is possible to improve the purity of the current paths passing through the insulating layer of the spacer layer, by two-stage nitriding or oxynitriding treatments using a nitriding or oxynitriding gas instead of the two-stage oxidation treatments using the oxidizing gas described above.

In the case where the first nitriding treatment is carried out instead of the first oxidation treatment, $N_2$ is used, for example, as the nitriding gas. Alternatively, a mixed gas of a nitriding gas (e.g., $N_2$) and a rare gas (e.g., Ar) may be used instead of $N_2$. In the case where the first oxynitriding treatment is carried out instead of the first oxidation treatment, a mixed gas of $O_2$ and $N_2$, for example, may be used as the oxynitriding gas. Alternatively, a mixed gas of an oxynitriding gas (e.g., mixture of $O_2$ and $N_2$) and a rare gas (e.g., Ar) may be used instead of the mixture of $O_2$ and $N_2$.

In the case where the second nitriding treatment is carried out instead of the second oxidation treatment, $N_2$ is used, for example, as the nitriding gas. In the case where the second oxynitriding treatment is carried out instead of the second oxidation treatment, a mixed gas of $O_2$ and $N_2$, for example, may be used as the oxynitriding gas.

EXAMPLES

Example 1

Figure 3:
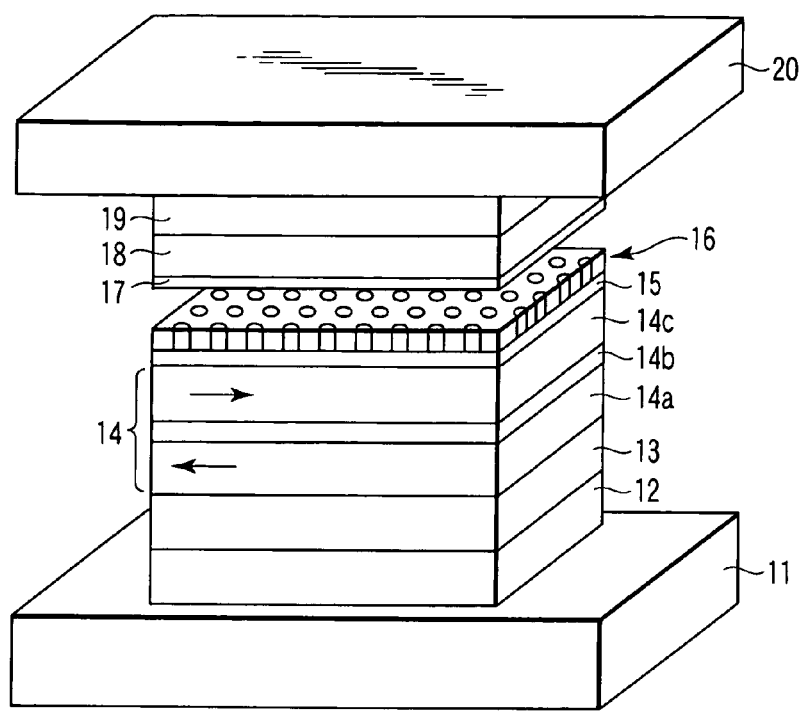
FIG. 3 is a perspective view showing the CCP-CPP element in Example 1.

In this Example, a magnetoresistive element having a stacked structure shown in FIG. 3 is fabricated in the following stacked structure:
lower electrode 11,
underlayer 12: Ta [5 nm]/Ru [2 nm],
pinning layer 13: $Pt_{50}Mn_{50}$ [15 nm],
pinned layer 14: $Co_{90}Fe_{10}$ [3.6 nm]/Ru [0.9 nm]/ {($Fe_{50}Co_{50}$ [1 nm]/Cu [0.25 nm])×2/$Fe_{50}Co_{50}$ [1 nm]},
metal layer 15: Cu [0.5 nm],
spacer layer 16: $Al_2O_3$ insulating layer 22 and Cu current paths 21 (produced by depositing $Al_{90}Cu_{10}$ [1 nm] and then performing first and second oxidation treatments),
metal layer 17: Cu [0.25 nm],
free layer 18: $Co_{90}Fe_{10}$ [1 nm]/$Ni_{83}Fe_{17}$ [3.5 nm],
cap layer 19: Cu [1 nm]/Ta [5 nm],
upper electrode 20.

The lower electrode 11 for supplying a sense current in the direction perpendicular to the spin valve film is formed on the substrate. Ta [5 nm] and Ru [2 nm] are deposited on the lower electrode 11 as the underlayer 12. The Ta layer is a buffer layer that suppresses roughness of the lower electrode. The Ru layer is a seed layer to control the crystal orientation and the grain size of the spin valve film to be deposited thereon. Ti, Zr, Hf, V, Cr, Mo, W, or the alloy thereof may be used for the buffer layer instead of Ta. The thickness of the buffer layer is preferably 3 to 5 nm. An excessively thin buffer layer leads to loss of the buffering effect. On the other hand, an excessively thick buffer layer is also undesirable, because it leads to increase in series resistance when the sense current is allowed to flow in the perpendicular direction. A material having a hcp or fcc structure is preferably used for the seed layer. Use of Ru for the seed layer makes it possible to set the crystal orientation of the spin valve film deposited thereon to fcc (111) orientation and that of the PtMn film to fct (111) orientation, and that of a film with a bcc structure to bcc (110) orientation. Also, the seed layer makes it possible to control the grain size of the spin-valve film to be deposited thereon in a range of 10 to 40 nm, and further makes it possible to achieve a suitable RA and high MR ratio without bringing about dispersion of area ratios of metal paths among elements. The thickness of the seed layer is preferably 2 to 6 nm. An excessively thin seed layer results in loss of the effect of controlling the crystal orientation. An excessively thick seed layer is also undesirable because it leads to increase in series resistance when a sense current is allowed to flow in the perpendicular direction.

The $Pt_{50}Mn_{50}$ layer [15 nm] as the pinning layer 13 is deposited on the underlayer 12. The pinning layer 13 serves to pin the magnetization direction of the pinned layer 14 to be deposited thereon. An excessively thin pinning layer is undesirable because it leads to loss of the pinning function, and an excessively thick pinning layer is also undesirable for the purpose of reducing the gap. When $Pt_{50}Mn_{50}$ is used for the pinning layer, the thickness of the $Pt_{50}Mn_{50}$ layer is preferably in a range of approximately 8 to 20 nm, more preferably in a range of 10 to 15 nm. Examples of antiferromagnetic materials for use as the pinning layer include PdPtMn and IrMn, in addition to PtMn. IrMn, which shows the pinning function at a thickness smaller than that of PtMn or PdPtMn, is preferable for reducing the gap. When IrMn is used for the pinning layer, the thickness of the IrMn layer is preferably 4 to 12 nm, more preferably 5 to 10 nm.

The pinned layer 14 is deposited on the pinning layer. In this Example, the pinned layer 14a employed is a synthetic pinned layer including a lower pinned layer 14a ($Co_{90}Fe_{10}$ [3.6 nm]), a magnetic coupling intermediate layer 14b (Ru [0.9 nm]), and an upper pinned layer 14c {($Fe_{50}Co_{50}$ [1 nm]/Cu [0.25 nm])×2/$Fe_{50}Co_{50}$ [1 nm]}. The lower pinned layer 14a is exchange-coupled with the pinning layer 13, and has unidirectional anisotropy. The lower pinned layer 14a and the upper pinned layer 14c are magnetically coupled via the magnetic coupling intermediate layer 14b in anti-parallel alignment.

The lower pinned layer 14a is preferably designed in such a manner that the magnetic thickness thereof, i.e., saturation magnetization Bs×thickness t (Bs·t), becomes almost the same as that of the upper pinned layer 14c. In this Example, the upper pinned layer 14c is made of ($Fe_{50}Co_{50}$ [1 nm]/Cu [2.5 nm])×2/$Fe_{50}Co_{50}$ [1 nm], in which FeCo has a saturation magnetization of approximately 2.2 T, and thus, the magnetic thickness is calculated as follows: 2.2 T×3 nm=6.6 Tnm. As for the lower pinned layer 14a, $Co_{90}Fe_{10}$ has a saturation magnetization of approximately 1.8 T, and thus, the thickness t of the lower pinned layer 14a having a magnetic thickness identical therewith will be calculated as follows: 6.6 Tnm/1.8 T=3.66 nm. In this Example, used is a $Co_{90}Fe_{10}$ layer with a thickness of 3.6 nm. The thickness of the magnetic layer used as the lower pinned layer is preferably in a range of approximately 2 to 5 nm, from the viewpoints of the unidirectional anisotropy field intensity by the pinning layer (PtMn) and the antiferromagnetic coupling field intensity between the lower and upper pinned layers via the Ru layer. An excessively small thickness leads to decrease in the MR ratio. An excessively large thickness makes it difficult to obtain a sufficient unidirectional anisotropy field needed for operation of the device.

Examples of the lower pinned layer 14a include, for example, a $Co_xFe_{100-x}$ alloy (where x is 0 to 100%), a $Ni_xFe_{100-x}$ alloy (where x is 0 to 100%), and those alloys that a nonmagnetic element is added to the above alloy.

The magnetic coupling intermediate layer (Ru layer) 14b serves to cause antiferromagnetic coupling to the lower and upper magnetic layers, thereby forming a synthetic pinned structure. The thickness of the Ru layer 14b is preferably 0.8 to 1 nm. Any material other than Ru may be used, as long as it causes sufficient antiferromagnetic coupling to the lower and upper magnetic layers.

The upper pinned layer 14c {($Fe_{50}Co_{50}$ [1 nm])/Cu [2.5 nm])×2/$Fe_{50}Co_{50}$ [1 nm]} forms a part of a spin-dependent scattering unit. In particular, the magnetic material present at the interface with the spacer layer is important, because it contributes to spin-dependent interface scattering. In this Example, employed is $Fe_{50}Co_{50}$ with a bcc structure.

Use of a magnetic material with the bcc structure at the interface with the spacer layer, which has an effect of producing a large spin-dependent interface scattering, results in a greater MR ratio. Examples of the FeCo-based alloys with the bcc structure include $Fe_xCo_{100-x}$ (where x is 30 to 100%) and an alloy prepared by adding an additive element to $Fe_xCo_{100-x}$. The metal material used for the spin valve film often has a fcc or fct structure, and thus, it is possible that only the upper pinned layer has the bcc structure. Thus, an excessively thin upper pinned layer is undesirable because it has difficulty in preserving the bcc structure and does not give a high MR ratio. The thickness of a magnetic material serves as the upper pinned layer (the pinned layer located between the spacer layer and Ru) is preferably a 2 nm or more, and is preferably 5 nm or less for obtaining a greater pinning magnetic field. When the pinned layer is formed of a magnetic layer with the bcc structure easy to provide a high MR ratio, the thickness of the layer with the bcc structure is preferably 2 nm or more, for preserving the bcc structure more reliably. The thickness of the pinned layer with the bcc structure is preferably in a range of approximately 2.5 to 4 nm, for obtaining a greater pinned magnetic field and a stable bcc structure. In addition, examples of the upper pinned layer also include $Fe_{75}Co_{25}$ to $Fe_{85}Co_{15}$ in a composition range allowing a stable bcc structure in the phase diagram. A CoFe alloy with a fcc structure or a cobalt alloy with a hcp structure may be used as the upper pinned layer instead of the magnetic material having the bcc structure. Any one of elemental metals such as Co, Fe, and Ni and alloy materials containing any one of these metals may also be used as the upper pinned layer.

The favorable magnetic materials for the upper pinned layer are listed in the order of providing a greater MR ratio as follows: alloy materials with the bcc structure, cobalt alloys containing cobalt in an amount of 50% or more, and nickel alloys containing Ni in an amount of 50% or more.

In this Example, a multilayer of alternately stacked magnetic layers (FeCo layers) and nonmagnetic layers (ultra-thin Cu layers) is used as the upper pinned layer. The upper pinned layer having such a structure enables to improve a spin-dependent scattering effect called a bulk scattering effect. In the CCP-CPP element, the current is confined in the vicinity of the spacer layer, and thus, contribution of resistance in the vicinity of the interface of the spacer layer becomes very significant. In such a case, since the contribution of interface scattering effect is greater than that of bulk scattering effect, it is important to properly select the material located at the interface with the spacer layer. Nevertheless, use of a material having a large bulk scattering effect is effective. The thickness of the Cu layer between magnetic layers is preferably 0.1 to 1 nm, more preferably 0.2 to 0.5 nm. An excessively thin Cu layer leads to insufficient improvement in bulk scattering effect. An excessively thick Cu layer is also undesirable, because it may lead to decrease in the bulk scattering effect, and also weakens the magnetic coupling between the upper and lower magnetic layers via the nonmagnetic Cu layer, which degrade characteristics of the pinned layer. Hf, Zr, Ti, or the like may be used as the material for the nonmagnetic layer between magnetic layers instead of Cu. On the other hand, the thickness of the magnetic layer of, for example, FeCo is preferably in a range of approximately 0.5 to 2 nm, more preferably 1 to 1.5 nm.

An upper pinned layer of an alloy of FeCo and Cu may be used instead of the upper pinned layer of alternately stacked FeCo and Cu layers. Examples of the FeCoCu alloys include $(Fe_xCo_{100-x})_{100-y}Cu_y$ (where x is 30 to 100%, and y is 3 to 15%), and alloys in other composition range may also be used. An element other than Cu such as Hf, Zr, or Ti may be used as the element added to FeCo. A single layer film of Co, Fe, Ni or an alloy thereof may be used as the upper pinned layer. For example, a $Co_{90}Fe_{10}$ single layer can be used as the upper pinned layer having the simplest structure. A further additive element may be added to the above materials.

Cu is deposited on the pinned layer 14 as the first nonmagnetic metal layer, which is a source for the current paths 21 in the spacer layer 16, and then AlCu is deposited on the first non-magnetic metal layer as the second metal layer to be converted into the insulating layer 22 of the spacer layer 16. Then, two-stage oxidation treatments in which the partial pressure of the oxidizing gas in the first oxidation treatment is set to 1/10 or less of the partial pressure of the oxidizing gas in the second oxidation treatment are carried out. In the case where a spacer layer containing Cu current paths passing through an $Al_2O_3$ insulating layer, the partial pressure of the oxidizing gas in the first oxidation treatment is more preferably $1\times10^{-8}$ to $1\times10^{-6}$ Torr and the partial pressure of the oxidizing gas in the second oxidation treatment is more preferably $1\times10^{-5}$ Torr or more, within the range that the partial pressure of the oxidizing gas in the first oxidation treatment is 1/10 or less of the partial pressure of the oxidizing gas in the second oxidation treatment.

First, the first oxidation treatment is performed under an oxygen-gas partial pressure of $1\times10^{-8}$ to $1\times10^{-6}$ Torr with supply of an oxidizing gas while irradiating the second metal layer with an ion beam or RF plasma of a rare gas (e.g., Ar). In the first oxidation treatment in this Example, oxygen is used as the oxidizing gas, and the oxygen-gas partial pressure in the chamber is set to $1\times10^{-7}$ Torr. With this treatment, Al in AlCu is converted into incomplete oxide $AlO_x$. In the first oxidation treatment, Ar ion is applied to the second metal layer under the conditions of an accelerating voltage of 30 to 130V, a beam current of 20 to 200 mA, and an irradiation time of 30 to 180 seconds. In this Example, the conditions of an accelerating voltage of 40 to 70V, a beam current of 30 to 80 mA, and an irradiation time of 60 to 150 seconds are selected and used within the above conditions. Cu of the first non-magnetic metal layer is sucked up in the incomplete oxide $AlO_x$ due to irradiation with the ion beam, and Cu passing through $AlO_x$ forms current paths. In addition, conversion of Al into $AlO_x$ enables to suppress interdiffusion of the metals Cu and Al and to reduce the amount of Al impurities in the Cu current paths.

Then, the second oxidation treatment is performed under an oxygen-gas partial pressure of $1\times10^{-5}$ or more in order to convert the incomplete oxide $AlO_x$ into a complete oxide $Al_2O_3$. In this Example, the partial pressure of the oxidizing gas is set to $1\times10^{-5}$ Torr. Also in the second oxidation treatment in this Example, an IAO process using irradiation with an ion beam or RF plasma of a rare gas (e.g., Ar) is carried out. In the IAO process, irradiation with Ar ion is performed under the conditions of an accelerating voltage of 40 to 200V, a beam current of 30 to 200 mA, and an irradiation time of 15 to 300 seconds. In this Example, conditions of an accelerating voltage of 50 to 100V, a beam current of 40 to 100 mA, and an irradiation time 30 to 180 seconds is selected within the above conditions. Since the IAO process in the second oxidation treatment is performed under an oxygen partial pressure higher than that in the first oxidation treatment, the process needs more intense beam conditions compared to those in the first oxidation treatment in order to obtain a favorable energy-assisting effect by the ion beam. In this process, oxygen can be migrated from the Cu current paths to the Al to be converted into insulating layer through oxidation-reduction reaction due to energy assist by ion beam.

The thickness of the first non-magnetic metal Cu layer, which becomes current paths, is adjusted depending on the thickness of the AlCu layer. This is because, when the thickness of the AlCu layer is increased, the amount of Cu to be sucked up into the AlCu layer should be increased in order to retain a certain area ratio of the current paths. If the thickness of Cu is thinner than a suitable range, the area ratio of the current paths is decreased, with the result that the areal resistance becomes higher than a suitable value. On the other hand, if the thickness of Cu is thicker than a suitable range, the current confined by the CCP-NOL spreads into Cu before it reaches the magnetic layer, leading to undesirable decrease in the MR ratio.

The first non-magnetic metal layer is preferably made of a material resistant to oxidation and lower in resistivity. Au or Ag may be used instead of Cu.

When AlCu is used for the second metal layer, not only Cu in the first non-magnetic metal layer is sucked up in AlCu in the first oxidation treatment but also Cu in AlCu is separated from Al, which form the current paths. In this Example, $Al_{90}Cu_{10}$ is used for the second metal layer, but pure Al containing no Cu may be used instead. When pure Al is used, the current paths are formed only by suck of Cu.

The material for the second metal layer is not limited to an Al alloy for forming $Al_2O_3$, and examples of the materials include Hf, Zr, Ti, Mg, Ta, Mo, W, Nb, Si, and alloys containing any one of elements as a main component. The material for the second metal layer is not limited to a nonmagnetic material, and a magnetic material may also be used. The insulating layer converted from the second metal layer is not limited to an oxide, but may be a nitride or oxynitride. Irrespective of the material used for the second metal layer, the thickness of the deposited second metal layer is preferably in a range of 0.5 to 2 nm, and the thickness after conversion to oxide, nitride or oxynitride is preferably in a range of approximately 0.8 to 3.5 nm.

The metal layer 17 of Cu [0.25 nm] is deposited on the spacer layer 16. The metal layer 17 serves as a barrier layer for preventing the free layer to be deposited thereon from being in contact with the oxide of the spacer layer 16 and oxidized. The metal layer 17 on the spacer layer 16 may not necessarily be formed, because it may be possible to avoid oxidation of the free layer by optimizing anneal conditions. Thus, the metal layer 15 below the spacer layer 16 is essential as a source for the current paths, but the metal layer 17 on the spacer layer 16 is not essential. However, it is preferable to form the metal layer 17 on the spacer layer 16, taking the production margin into consideration. Au, Ag and Ru may be used as the material for the metal layer 17 instead of Cu. However, the material for the metal layer 17 is preferably the same as that for the current paths in the spacer layer 16. If a material different from that for the current paths is used for the metal layer 17, it leads to increase in interface resistance, but there is no increase in interface resistance when both are the same material. The thickness of the metal layer 17 is preferably 0 to 1 nm and more preferably 0.1 to 0.5 nm. If the metal layer 17 is excessively thick, the current confined by the spacer layer 16 is spread in the metal layer 17, which lowers the current confinement effect, leading to reduction in MR ratio.

The free layer 18 made of $Co_{90}Fe_{10}$ [1 nm]/$Ni_{83}Fe_{17}$ [3.5 nm] is deposited on the metal layer 17. In order to obtain a high MR ratio, it is important to select a proper magnetic material for the free layer 18 located at the interface with the spacer layer. In this case, a CoFe alloy is preferably arranged at the interface with the spacer layer, rather than a NiFe alloy. In this Example, used is $Co_{90}Fe_{10}$ particularly superior in soft magnetic characteristics among CoFe alloys. When a CoFe alloy closer in composition to $Co_{90}Fe_{10}$ is used, the thickness thereof is preferably set to 0.5 to 4 nm. When a CoFe alloy in another composition (e.g., a composition described above in connection with the pinned layer) is used, the thickness thereof is preferably set to 0.5 to 2 nm. For example, when $Fe_{50}Co_{50}$ (or $Fe_xCo_{100-x}$, where x is 45 to 85) having a bcc structure is used for the free layer, like the pinned layer, for improvement in spin-dependent interface scattering effect, an excessively thick film is undesirable for preserving the soft magnetic characteristics of the free layer, and thus, the thickness thereof is preferably in the range of 0.5 to 1 nm. When Fe containing no Co is used, which is relatively superior in soft magnetic characteristics, the thickness thereof may be set to approximately 0.5 to 4 nm. The NiFe layer arranged on the CoFe layer is a material having the most stable soft magnetic characteristics. The soft magnetic characteristics of the CoFe alloy is not so stable, but presence of the NiFe alloy thereon reinforces the soft magnetic characteristics of the CoFe alloy, making it possible to provide a greater MR ratio. The composition of the NiFe alloy is preferably $Ni_xFe_{100-x}$ (where x is in a range approximately 78 to 85%). In the present Example, the NiFe has a Ni rich composition ($Ni_{83}Fe_{17}$) compared to commonly used $Ni_{81}Fe_{19}$. This is because the Ni composition allowing zero magnetic strain varies in composition when a free layer is formed on the spacer layer of the CCP structure. The thickness of the NiFe layer is preferably in a range of approximately 2 to 5 nm. Instead of NiFe layer, a free layer of multilayer prepared by alternately stacking layers of CoFe or Fe layers with a thickness of 1 to 2 nm and ultra-thin Cu layers with a thickness of 0.1 to 0.8 nm may be used.

The cap layer 19 made of Cu [1 nm]/Ru [10 nm] is stacked on the free layer 18. The cap layer 19 serves to protect the spin valve film. The thickness of the Cu layer is preferably in a range of 0.5 to 10 nm. A Ru layer with a thickness of 0.5 to 10 nm may be formed directly on the free layer 18 without providing the Cu layer. Another metal layer may be provided on the Cu layer instead of the Ru layer. The structure of the cap layer is not particularly limited, and any other materials may be used as long as they exhibit the capping effect. An upper electrode 20 for supplying a current perpendicularly to the spin valve film is formed on the cap layer 19.

Evaluation of the characteristics of the CCP-CPP element in this Example shows the following values: RA of 500 mΩμm², ΔRA of 45 mΩμm², and MR ratio of 9%. Such a high MR ratio is achieved due to increase in purity of the Cu current paths through the two-stage oxidation treatments.

Example 2

In this Example, CCP-CPP elements are manufactured with various methods and characteristics of these CCP-CPP elements are compared. These results will be described below. The magnetoresistive elements prepared have the following stacked structure:

lower electrode 11,
underlayer 12: Ta [5 nm]/Ru [2 nm],
pinning layer 13: $Pt_{50}Mn_{50}$ [15 nm],
pinned layer 14: $Co_{90}Fe_{10}$ [4 nm]/Ru [0.9 nm]/$Co_{90}Fe_{10}$ [4 nm],
metal layer 15: Cu [0.5 nm],
spacer layer 16: $Al_2O_3$ insulating layer 22 and Cu current paths 21 (produced by depositing $Al_{90}Cu_{10}$ [0.5 to 1 nm] and then performing first and second oxidation treatments),
metal layer 17: Cu [0.25 nm],
free layer 18: $Co_{90}Fe_{10}$ [1 nm]/$Ni_{83}Fe_{17}$ [3.5 nm],
cap layer 19: Cu [1 nm]/Ta [5 nm].

In this Example, each CCP-CPP element is prepared by changing the thickness of the AlCu layer used as the second metal layer in a range of 0.5 to 1 nm. Since change in the AlCu thickness brings about change in the area ratio of the CCP-NOL current paths, a variety of areal resistances RA can be obtained. In addition, since this Example is directed to compare difference in characteristics of the CCP-CPP elements due to difference in manufacturing methods, used for the pinned layer is $Co_{90}Fe_{10}$ [4 nm]/Ru [0.9 nm]/$Co_{90}Fe_{10}$ [4 nm], which is a simpler structure than that of the pinned layer in Example 1.

In producing the CCP-NOL in this Example, a first non-magnetic metal layer and a second metal layer are deposited, and then two-stage oxidation treatments in which the partial pressure of the oxidizing gas in the first oxidation treatment is set to 1/10 or less of the partial pressure of the oxidizing gas in the second oxidation treatment are carried out, wherein the second metal layer is irradiated with an ion beam or RF plasma of a rare gas in the first oxidation treatment. In Example 2, CCP-CPP elements are manufactured under partial pressures of the oxidizing gas in the first oxidation treatment set to the following three levels:

Example 2(A): the partial pressure of the oxidizing gas in the first oxidation treatment is set to $1 \times 10^{-8}$ Torr;
Example 2(B): the partial pressure of the oxidizing gas in the first oxidation treatment is set to $1 \times 10^{-7}$ Torr; and
Example 2(C): the partial pressure of the oxidizing gas in the first oxidation treatment is set to $1 \times 10^{-6}$ Torr.

In all of the Examples 2(A), 2(B) and 2(C), the partial pressure of the oxidizing gas in the second oxidation treatment is set to $1 \times 10^{-5}$ Torr. In Examples 2(A), 2(B) and 2(C), an IAO process is performed in which incomplete oxide $AlO_x$ is irradiated with an ion beam or RF plasma of a rare gas (e.g., Ar) in the second oxidation treatment.

As Comparative Examples for comparing with the CCP-CPP elements of Examples 2(A), 2(B) and 2(C), CCP-CPP elements are manufactured by the following two methods in which, in producing a CCP-NOL, the first non-magnetic metal layer and the second metal layer are deposited and then a comparative oxidation treatment is performed.

Comparative Example 1

Two-stage oxidation treatments are performed in which a partial pressure of an oxidizing gas in a first oxidation treatment is set to 1/10 or more of a partial pressure of an oxidizing gas in a second oxidation treatment. In the first oxidation treatment, the second metal layer is irradiated with an ion beam or RF plasma of a rare gas. The partial pressure of the oxidizing gas in the first oxidation treatment is set to $5 \times 10^{-6}$ Torr, and the partial pressure of the oxidizing gas in the second oxidation treatment is set to $1 \times 10^{-5}$ Torr. In the second oxidation treatment, an IAO process is performed in which incomplete oxide $AlO_x$ is irradiated with an ion beam or RF plasma of a rare gas (e.g., Ar).

Comparative Example 2

A one-stage oxidation treatment is performed in which the partial pressure of the oxidizing gas is set to $1 \times 10^{-5}$ Torr. In the oxidation treatment in Comparative Example 2, an IAO process is performed in which the second metal layer is irradiated with an ion beam or RF plasma of a rare gas (e.g., Ar).

Figure 4:
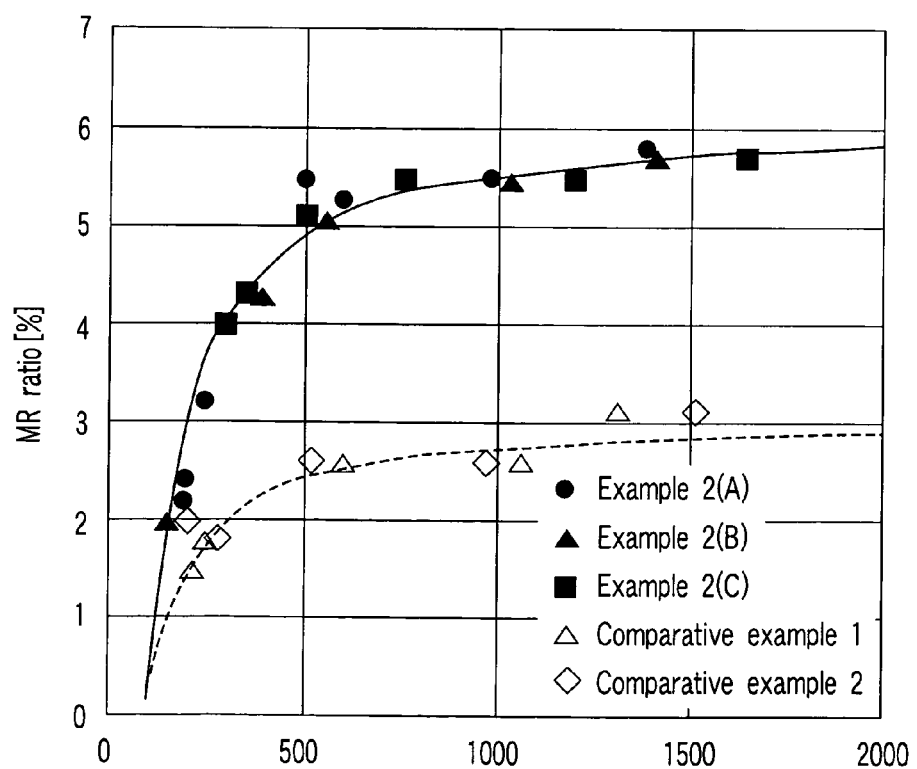
FIG. 4 is a graph showing a relationship between RA and MR ratio of the CCP-CPP elements manufactured in Example 2.

FIG. 4 shows a relationship between RA and MR of the CCP-CPP elements manufactured with the aforementioned various methods.

In Examples 2(A), 2(B) and 2(C) and Comparative Examples 1 and 2, areal resistances in a range of 100 to 1,500 mΩμm² are given by changing the thickness of the AlCu film. For the purpose of comparing the characteristics of the CCP-CPP elements, it is effective to compare the MR ratios of the elements having a similar areal resistance. The MR ratios of the CCP-CPP elements at the areal resistance of 500 mΩμm² are as follows:

5.5% for Example 2(A);
5.0% for Example 2(B);
5.1% for Example 2(C);
2.5% for Comparative Example 1; and
2.4% for Comparative Example 2.

The MR ratios of Examples 2(A), 2(B) and 2(C) are almost the same and higher than those of Comparative Examples 1 and 2. Thus, the CCP-CPP elements can achieve a higher MR ratio in the case where the two-stage oxidation treatments with different partial pressures of oxidizing gas in which the partial pressure of the oxidizing gas in the first oxidation treatment is set to 1/10 or less of the partial pressure of the oxidizing gas in the second oxidation treatment as in Examples 2(A), 2(B) and 2(C).

The reason why a higher MR ratio is obtained in Examples 2(A), 2(B) and 2(C) than in Comparative Examples 1 and 2 will be discussed below. Here, the discussion will be based on the model proposed by Valet and Fert, referred to as a Valet-Fert model hereinafter (T. Valet and A. Fert, Phys. Rev. B 48, 7099 (1993)). To discuss experiments according to the Examples, the Valet-Fert model must be adapted to the CCP-CPP element. The following assumption is made in order to extend the Valet-Fert model. That is, in the CCP-CPP element, a current is confined in the current paths in the spacer layer, so that the area of the interface between the spacer layer and the pinned layer or free layer is dependent on the area ratio D [%] of the current paths. Further, in the CCP-CPP element, the resistance of the spacer layer accounts for a larger percentage of the total resistance. Consequently, of the spin-dependent scattering, the interface scattering effect is more significant than the bulk scattering effect. Thus, the bulk scattering effect is neglected for simplification of calculations herein.

Figures 5A, 5B, 5C:
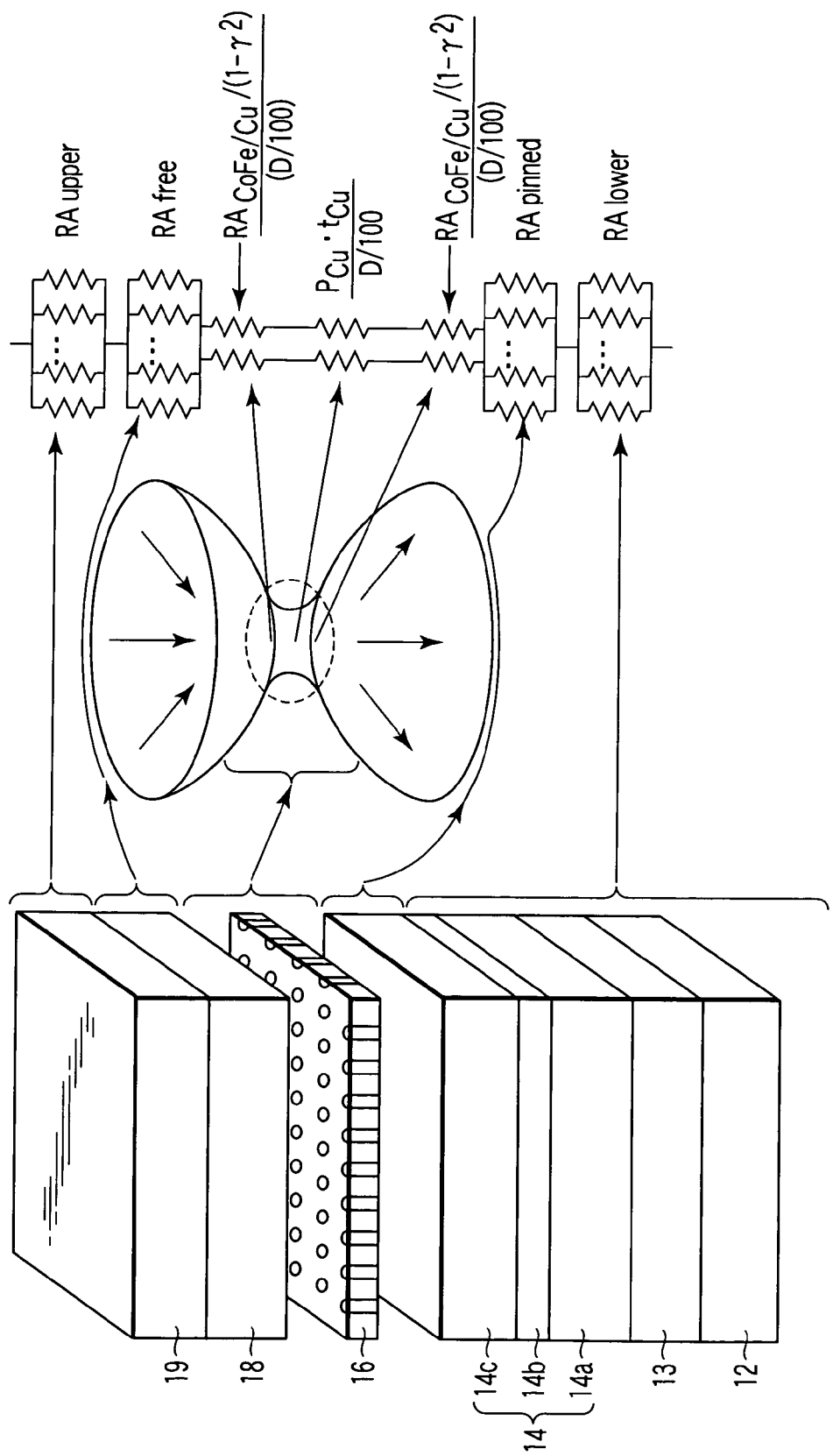
FIGS. 5A, 5B and 5C are a perspective view showing the CCP-CPP element in Example 2, an enlarged perspective view of a current path, and an equivalent circuit diagram of the CCP-CPP element, respectively.

FIG. 5A shows a perspective view of the CCP-CPP element in this Example. FIG. 5B shows an enlarged perspective view of a current path. FIG. 5C shows an equivalent circuit diagram of the CCP-CPP element in this Example.

In FIG. 5C, $RA_{upper}$ denotes the areal resistance of the cap layer 19 and upper electrode, located above the free layer 18. $RA_{free}$ denotes the areal resistance of the free layer 18. $RA_{pinned}$ denotes the areal resistance of the upper pinned layer 14c, sandwiched between Ru and CCP-NOL, which contributes to the GMR effect. $RA_{lower}$ denotes the areal resistance of Ru 14b, lower pinned layer 14a, pinning layer 12, underlayer 12, and lower electrode, located below the upper pinned layer 14c. As shown in FIG. 5C, the resistance of the Cu current paths in CCP-NOL is determined by diving the product of the specific resistance $\rho_{Cu}$ and thickness $t_{Cu}$ of the Cu current paths by the area ratio D of the current paths, that is, $\rho_{Cu}t_{Cu}/(D/100)$. The interface resistance between the current path and the free layer 18 or upper pinned layer 14c (in both interfaces, the current paths are in contact with CoFe) is determined by dividing $RA_{CoFe/Cu}$ by the area ratio D of the current paths taking an interface scattering coefficient γ into account, that is, $RA_{CoFe/Cu}/(1-\gamma^2)/(D/100)$.

In the above model, $RA_{CCP}$ of CCP-NOL is expressed by equation (1), and $\Delta RA_{interface}$ is expressed by equation (2):

$$RA_{CCP} = \frac{\{2RA_{CoFe/Cu}/(1-\gamma^2) + \rho_{Cu}t_{Cu}\}}{(D/100)} [m\Omega\mu m^2] \quad (1)$$

$$\Delta RA_{interface} = \frac{(\Delta RA_{pinned/spacer} + \Delta RA_{free/spacer})}{(D/100)} \quad (2)$$
$$= \frac{\left(4\gamma RA^*_{CoFe/Cu}{}^2 / (\rho_{Cu}t_{Cu} + 2RA^*_{CoFe/Cu})\right)}{(D/100)} [m\Omega\mu m^2]$$

On the basis of these models, the relationship between the RA and MR ratio of the CCP-CPP spin-valve film is calculated. First, the RA value except for $RA_{CCP}$ is set to 100 $m\Omega\mu m^2$. This value is introduced from an RA value experimentally determined for a metal CCP element. $RA_{CoFe/Cu}$ is set to 0.2 $m\Omega\mu m^2$ on the basis of document values. The thickness $t_{Cu}$ is set to 1.5 nm, which is equal to the thickness of CCP-NOL obtained from cross-sectional TEM observation. The interface scattering coefficient γ is set to 0.62, which is experimentally determined for a metal CCP element.

Comparison of the resistivities of Cu constituting current paths shows a tendency that the Cu resistivities of the current paths in Examples 2(A), 2(B) and 2(C) are almost the same and lower than those in Comparative Examples 1 and 2. The fact indicates that, in Examples 2(A), 2(B) and 2(C), suck of Cu is induced by the first oxidation treatment under an oxygen partial pressure in the range of $1\times10^{-8}$ to $1\times10^{-6}$ Torr of the two-stage oxidation treatments different in the partial pressure of the oxidizing gas, and high-purity Cu current paths are formed. In Comparative Example 2, in which the one-stage oxidation treatment under an oxidizing gas partial pressure of $1\times10^{-5}$ Torr is performed, the suck of Cu does not occur, which is caused in the first oxidation treatment in the Examples. Since AlCu is used as the second metal layer in Comparative Example 2, a phase separation phenomenon is caused to some degree and Cu separated from Al can form current paths even though there is no suck of Cu. However, separation of Cu from Al is extremely insignificant compared to the case where the suck of Cu is caused. In Comparative Example 1, the two-stage oxidation treatments different in the partial pressure of the oxidizing gas are performed. However, the partial pressure of the oxidizing gas in the first oxidation treatment is so high that the irradiation of the ion beam is hindered by the oxidizing gas and becomes insufficient. Thus, the ion beam cannot exert sufficient energy assist effect to cause suck of Cu. As a result, separation of Cu from Al is extremely poor, like Comparative Example 2, compared with the case where the suck of Cu is caused.

As described above, it is possible to form high-purity Cu current paths and to manufacture a CCP-CPP element with a high MR ratio, by performing two-stage oxidation treatments in which the partial pressure of the oxidizing gas in the first oxidation treatment is set to ⅒ or less of the partial pressure of the oxidizing gas in the second oxidation treatment, wherein the second metal layer is irradiated with an ion beam or RF plasma of a rare gas in the first oxidation treatment.

Hereinafter, applications of the magnetoresistive element (CCP-CPP element) according to the embodiments will be described.

Figure 6:
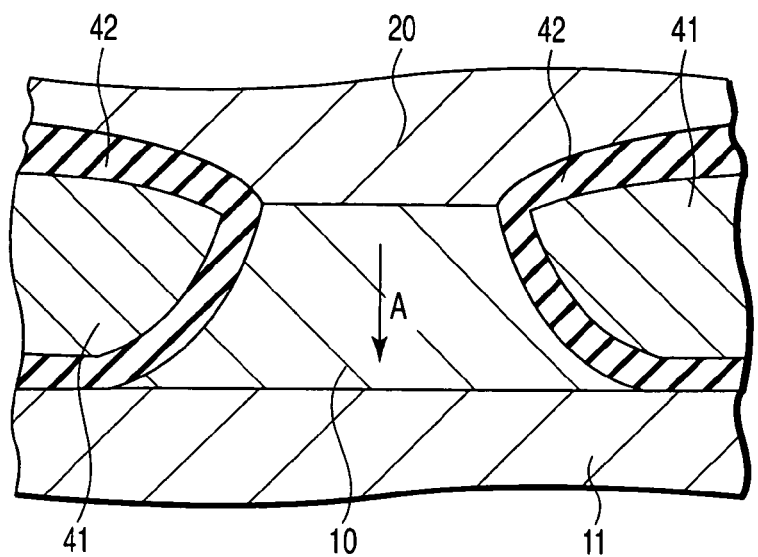
FIG. 6 is a cross-sectional view showing a magnetic head in an embodiment.
Figure 7:
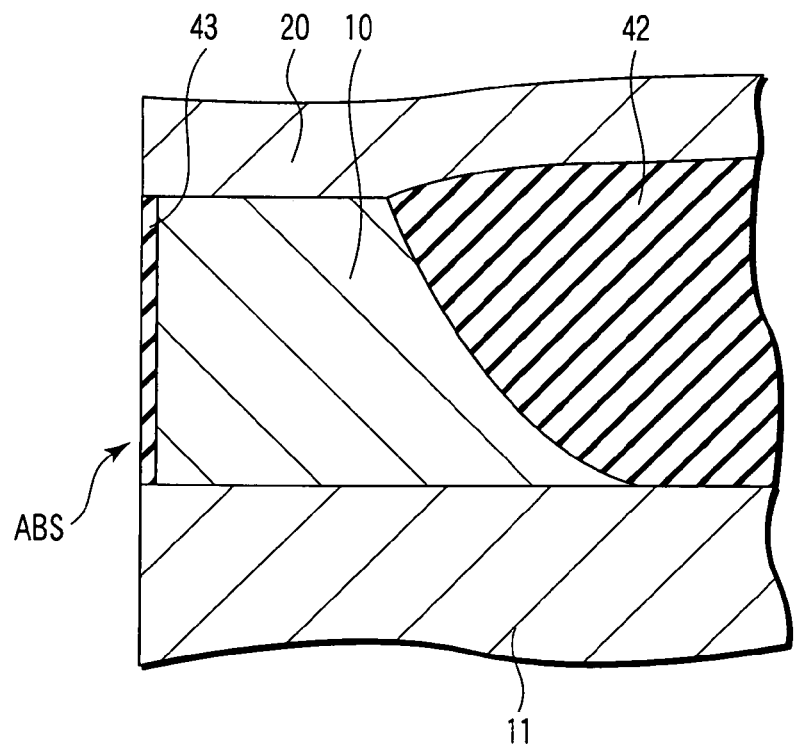
FIG. 7 is a cross-sectional view showing a magnetic head according to another embodiment.

FIGS. 6 and 7 show a magnetoresistive element according to an embodiment which is incorporated in a magnetic head. FIG. 6 is a cross-sectional view of the magnetoresistive element taken along a direction substantially parallel to the air bearing surface (ABS) facing a magnetic recording media (not shown). FIG. 7 is a cross-sectional view of the magnetoresistive element taken along a direction perpendicular to the air bearing surface (ABS).

The magnetic head shown in FIGS. 6 and 7 has a so-called hard abutted structure. The magnetoresistive film 10 is an aforementioned CCP-CPP film. The lower electrode 11 and the upper electrode 20 are provided below and above the magnetoresistive film 10, respectively. In FIG. 6, insulating films 42 and bias field application films 41 are formed on the both sides of the magnetoresistive film 10. As shown in FIG. 7, a protective layer 43 is provided on the air bearing surface of the magnetoresistive film 10.

A sense current for the magnetoresistive film 10 is supplied by the electrodes 11 and 20 arranged below and above the magnetoresistive film 10 perpendicularly to the plane as shown by arrow A. Further, the pair of bias field application films 41, 41, provided on the both sides of the magnetoresistive film 10, applies a bias field to the magnetoresistive film 10. The bias field controls the magnetic anisotropy of the free layer in the magnetoresistive film 10 to make the free layer into a single domain. This stabilizes the domain structure of the free layer. It is thus possible to suppress Barkhausen noise associated with movement of magnetic domain walls.

The present invention improves the MR ratio of the magnetoresistive element. Accordingly, the application of the present invention to a magnetic head enables sensitive readout.

The magnetic head shown in FIGS. 6 and 7 may be incorporated in a read/write integrated magnetic head assembly, which can then be mounted on a magnetic recording apparatus.

Figure 8:
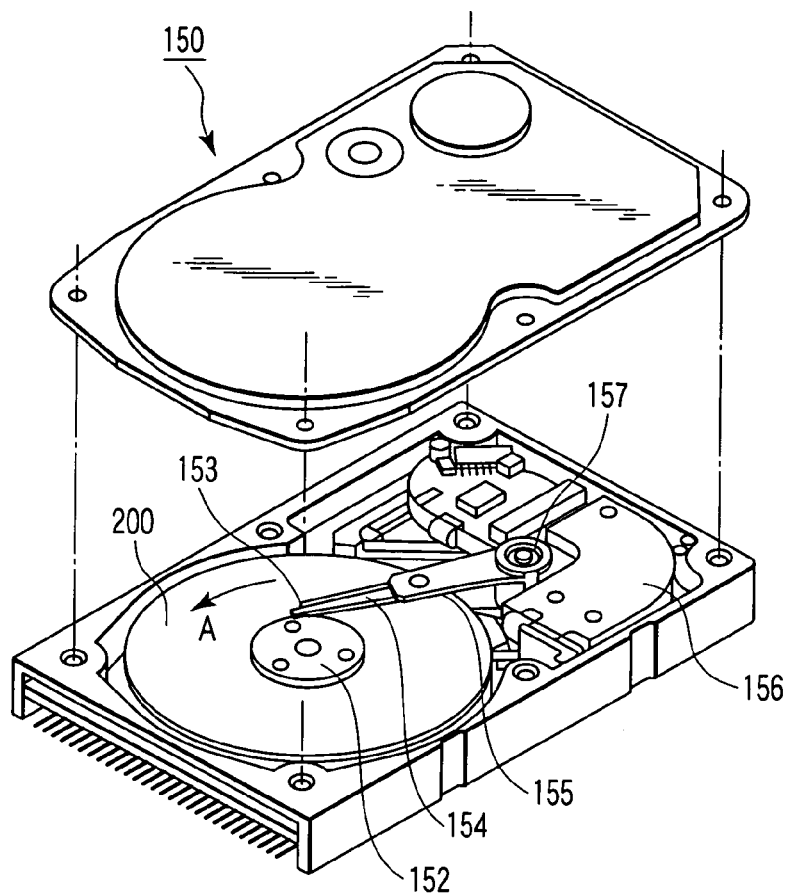
FIG. 8 is a perspective view showing a magnetic recording/reproducing apparatus according to an embodiment.

FIG. 8 is a perspective view schematically showing the configuration of a major portion of such a magnetic recording apparatus. A magnetic recording apparatus 150 is of a type using a rotary actuator. In this figure, a magnetic disk 200 is installed on a spindle 152. The magnetic disk 200 is rotated in the direction of arrow A by a spindle motor that responds to control signals from a drive controller (not shown). The magnetic recording apparatus 150 according to the present invention may comprise a plurality of disks 200.

A head slider 153 to read from and write to the magnetic disk 200 is attached to the tip of a suspension 154. The head slider 153 has a magnetic head mounted near the tip thereof and including the magnetoresistive element according to any of the above embodiments.

When the magnetic disk 200 rotates, the air bearing surface (ABS) of head slider 153 is held so as to float over the surface of the magnetic disk 200 with a predetermined height. The head slider 153 may be of a so-called in-contact type contacting to the magnetic disk 200.

The suspension 154 is connected to one end of an actuator arm 155. A voice coil motor 156, a kind of linear motor, is provided on the other end of the actuator arm 155. The voice coil motor 156 forms a magnetic circuit including a driving coil (not shown) wound around a bobbin and a permanent magnet and a counter yoke arranged opposite each other so as to sandwich the coil therebetween.

The actuator arm 155 is held by ball bearings (not shown) provided at two vertical positions of the pivot 157. The actuator arm 155 can be rotatably slid by the voice coil motor 156.

Figure 9:
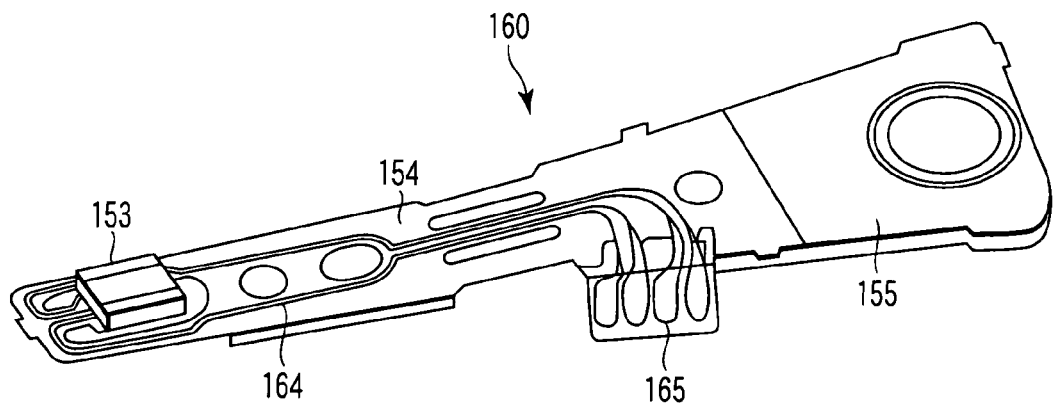
FIG. 9 is a perspective view showing a head gimbal assembly according to an embodiment.

FIG. 9 is an enlarged perspective view of a part of the head gimbal assembly including tip end side of the actuator arm 155, which is viewed from the disk. The assembly 160 has the actuator arm 155, and the suspension 154 is connected to one end of the actuator arm 155. The head slider 153, attached to the tip of the suspension 154, comprises a magnetic head including the magnetoresistive element according to any of the above embodiments. The suspension 154 has leads 164 for transmitting write and read signals. The leads 164 are electrically connected to respective electrodes in the magnetic head incorporated in the head slider 153. Reference numeral 165 in the figure denotes electrode pads of the assembly 160.

The present invention comprises the magnetic head including the magnetoresistive element according to any of the above embodiments. This makes it possible to reliably read information magnetically recorded on the magnetic disk 200 at a recording density higher than that of the conventional one.

The embodiments of the present invention have been described with reference to the specific examples. However, the present invention is not limited to these specific examples. For example, for the specific structure of the magnetoresistive element as well as the shapes and materials of the electrodes, bias application film, insulating film, and the like, those skilled in the art can similarly implement the present invention to produce similar effects by making appropriate selections from the corresponding well-known ranges.

For example, when the magnetoresistive element is applied to a read magnetic head, the detection resolution of the magnetic head can be defined by providing magnetic shields on both sides of the element.

Further, the present invention can be applied to a magnetic head or magnetic recording apparatus based on a perpendicular magnetic recording system as well as a longitudinal magnetic recording system, and can produce similar effects in any system.

Moreover, the magnetic recording apparatus according to the present invention may be a so-called a rigid type constantly provided with particular recording media or a removable type that allows recording media to be exchanged.

The scope of the present invention also includes all magnetoresistive elements, magnetic heads, magnetic recording apparatuses, and magnetic memories that can be implemented by those skilled in the art by appropriately changing the designs of the above magnetic heads and magnetic recording apparatuses described above as the embodiments of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing a magnetoresistive element having a magnetization pinned layer, a magnetization free layer, and a spacer layer including an insulating layer and current paths passing through the insulating layer, provided between the magnetization pinned layer and the magnetization free layer, the method comprising, in producing the spacer layer:

depositing a first non-magnetic metal layer forming the current paths;

depositing a second metal layer to be converted into the insulating layer on the first non-magnetic metal layer; and performing two stages of oxidation treatments in which a partial pressure of an oxidizing gas in a first oxidation treatment is set to $1/10$ or less of a partial pressure of an oxidizing gas in a second oxidation treatment, two stages of nitriding treatments in which a partial pressure of a nitriding gas in a first nitriding treatment is set to $1/10$ or less of a partial pressure of a nitriding gas in a second nitriding treatment or two stages of oxynitriding treatments in which a partial pressure of an oxynitriding gas in a first oxynitriding treatment is set to $1/10$ or less of a partial pressure of an oxynitriding gas in a second oxynitriding treatment, and the second metal layer being irradiated with an ion beam or a RF plasma of a rare gas in the first oxidation treatment, the first nitriding treatment or the first oxynitriding treatment, wherein the first oxidation treatment, the first nitriding treatment or the first oxynitriding treatment serves to convert the second metal layer into an incomplete oxide, an incomplete nitride or an incomplete oxynitride and to suck up the first non-magnetic metal layer in the incomplete oxide, the incomplete nitride or the incomplete oxynitride, and the second oxidation treatment, the second nitriding treatment or the second oxynitriding treatment serves to convert the incomplete oxide, the incomplete nitride or the incomplete oxynitride into the insulating layer.

2. The method according to claim 1, wherein the partial pressure of the oxidizing gas in the first oxidation treatment, the partial pressure of the nitriding gas in the first nitriding treatment or the partial pressure of the oxynitriding gas in the first oxynitriding treatment is set to between $1 \times 10^{-8}$ and $1 \times 10^{-6}$ Torr, and wherein the partial pressure of the oxidizing gas in the second oxidation treatment, the partial pressure of the nitriding gas in the second nitriding treatment or the partial pressure of the oxynitriding gas in the second oxynitriding treatment is set to $1 \times 10^{-5}$ Torr or more.

3. The method according to claim 1, wherein the partial pressure of the oxidizing gas in the first oxidation treatment is set to between $1/1,000$ to $1/10$ of the partial pressure of the oxidizing gas in the second oxidation treatment, the partial pressure of the nitriding gas in the first nitriding treatment is set to between $1/1,000$ to $1/10$ of the partial pressure of the nitriding gas in the second nitriding treatment or the partial pressure of the oxynitriding gas in the first oxynitriding treatment is set to between $1/1,000$ to $1/10$ of the partial pressure of the oxynitriding gas in the second oxynitriding treatment.

4. The method according to claim 1, further comprising forming a non-magnetic metal layer on the spacer layer.

5. The method according to claim 1, wherein the first oxidation treatment, the first nitriding treatment or the first oxynitriding treatment is performed under a condition of an accelerating voltage for the ion beam or RF plasma of the rare gas set to between 30V or more and 130V or less.

6. The method according to claim 1, wherein the second oxidation treatment, the second nitriding treatment or the second oxynitriding treatment is performed while irradiating an oxide, a nitride or an oxynitride of the second metal layer with an ion beam or a RF plasma of a rare gas.

7. The method according to claim 6, wherein the second oxidation treatment, the second nitriding treatment or the second oxynitriding treatment is performed under a condition of an accelerating voltage for the ion beam or RF plasma of the rare gas set to between 50V or more and 100V or less.

8. The method according to claim 1, wherein the first non-magnetic metal layer contains at least one element selected from the group consisting of Cu, Au and Ag.

9. The method according to claim 1, wherein the insulating layer is made of an oxide, a nitride or an oxynitride containing at least one element selected from the group consisting of Al, Si, Hf, Mg, Ti, Ta, Mo, W, Nb, Cr and Zr.

* * * * *